United States Patent
Howe et al.

(10) Patent No.: US 10,808,779 B2
(45) Date of Patent: Oct. 20, 2020

(54) ANTI REVERSE RATCHET MECHANISM FOR A GROUNDED SLACK

(71) Applicant: Bendix Commercial Vehicle Systems LLC, Elyria, OH (US)

(72) Inventors: Stephen Howe, Cuyahoga Falls, OH (US); Lawrence F. Gilboy, Amherst, OH (US)

(73) Assignee: BENDIX COMMERICAL VEHICLE SYSTEMS LLC, Elyria, OH (US)

( * ) Notice: Subject to any disclaimer, the term of this patent is extended or adjusted under 35 U.S.C. 154(b) by 217 days.

(21) Appl. No.: 16/051,837

(22) Filed: Aug. 1, 2018

(65) Prior Publication Data
US 2020/0040951 A1    Feb. 6, 2020

(51) Int. Cl.
*F16D 59/00* (2006.01)
*F16D 63/00* (2006.01)
*F16D 65/40* (2006.01)

(52) U.S. Cl.
CPC ........... *F16D 59/00* (2013.01); *F16D 63/006* (2013.01); *F16D 65/40* (2013.01)

(58) Field of Classification Search
CPC ......... F16D 59/00; F16D 65/40; F16D 63/006
See application file for complete search history.

(56) References Cited

U.S. PATENT DOCUMENTS

| | | | |
|---|---|---|---|
| 3,342,293 A | 9/1967 | Hildebrand et al. | |
| 4,055,914 A * | 11/1977 | Ieda | B62J 3/00 446/420 |
| 4,088,206 A * | 5/1978 | Garrett | F16D 65/60 188/196 D |
| 4,380,276 A * | 4/1983 | Sweet | F16D 65/60 188/196 BA |
| 4,620,617 A | 11/1986 | Weber | |
| 4,621,714 A | 11/1986 | Skurka | |
| 4,926,980 A | 5/1990 | Cumming | |
| 5,036,958 A | 8/1991 | Yamamoto | |
| 5,088,581 A * | 2/1992 | Duve | F16D 41/12 192/46 |
| 5,184,739 A * | 2/1993 | Kusz | A61J 7/04 116/308 |
| 5,188,251 A * | 2/1993 | Kusz | A61J 7/04 116/308 |

(Continued)

FOREIGN PATENT DOCUMENTS

| | | |
|---|---|---|
| CN | 201231746 Y | 5/2009 |
| CN | 201249752 Y | 6/2009 |

(Continued)

OTHER PUBLICATIONS

Bendix Commercial Vehicle Systems LLC, "Bendix® Versajust™ Automatic Slack Adjuster", 2011, 8 pages.

*Primary Examiner* — Vishal R Sahni
(74) *Attorney, Agent, or Firm* — Fay Sharpe LLP (57) ABSTRACT

A ratchet device for providing anti-reverse locking for a grounded slack comprises a pinwheel having flexible angled spokes circumferentially protruding therefrom and a pinion ring into which the pinwheel fits includes a plurality of angled teeth with which the angled spokes mate. The spokes flex and slide over the pinion ring teeth when the ratchet is advanced in a forward direction, and lock against the teeth when the ratchet is not being advanced.

22 Claims, 10 Drawing Sheets

(56) References Cited

U.S. PATENT DOCUMENTS

| | | | | |
|---|---|---|---|---|
| 5,678,712 | A * | 10/1997 | Rios | B65D 50/041 |
| | | | | 116/308 |
| 5,690,202 | A * | 11/1997 | Myers | F16D 41/12 |
| | | | | 188/82.7 |
| 5,934,596 | A * | 8/1999 | Gorman | B60R 22/3413 |
| | | | | 242/379.1 |
| 5,967,350 | A * | 10/1999 | Jones | B65D 41/06 |
| | | | | 116/309 |
| 6,450,302 | B1 * | 9/2002 | Lyons | F16D 65/58 |
| | | | | 188/196 BA |
| 7,198,138 | B2 | 4/2007 | Chadha et al. | |
| 8,302,742 | B2 | 11/2012 | Louis et al. | |
| 8,672,101 | B2 | 3/2014 | Louis et al. | |
| 8,973,722 | B2 | 3/2015 | Kromer et al. | |
| 10,414,561 | B1 * | 9/2019 | Moghaddam | B65D 50/041 |
| 2006/0163014 | A1 | 7/2006 | Crewson | |
| 2007/0266817 | A1 * | 11/2007 | Lassiter | B62K 21/26 |
| | | | | 74/551.8 |

FOREIGN PATENT DOCUMENTS

| | | |
|---|---|---|
| EP | 0762007 A1 | 3/1997 |
| WO | 2012/112659 A2 | 8/2012 |

\* cited by examiner

ANTI REVERSE RATCHET MECHANISM FOR A GROUNDED SLACK

BACKGROUND

The present application finds particular application in ratcheting devices. However, it will be appreciated that the described techniques may also find application in other ratcheting systems, or other mechanical devices.

Conventional ratchet arrangements for grounded slacks require an adjustment mechanism with a one-way clutch to prevent unwanted de-adjustment. One design employs a spring-loaded pawl that protrudes out of a cylinder side surface, such designs tend to be unwieldy and cumbersome. Moreover, these arrangements employ many parts, which increases potential ratchet failure.

The present innovation provides new and improved systems and methods that facilitate providing a hub-and-spoke ratchet arrangement for an anti-reverse ratchet for a grounded slack, which overcome the above-referenced problems and others.

SUMMARY

In accordance with one aspect, a ratchet device comprises a central shaft, a pinion ring portion positioned on the central shaft and comprising a plurality of teeth uniformly and circumferentially arranged on an interior circumference thereof, and a pinwheel positioned on the central shaft and comprising a plurality of angled spokes that cooperate with the teeth to lock the ratchet device and prohibit reverse motion. The ratchet device further comprises a stepped washer positioned on the central shaft and which aligns the pinwheel coaxially with the pinion ring portion and provides a bearing surface for the pinwheel.

In accordance with another aspect, a pinwheel for a ratchet device comprises a hub portion and a plurality of flexible angled spokes arranged uniformly around and extending from the hub portion. The hub portion comprises a central hole for receiving a central shaft. The number of spokes in the plurality of spokes is a factor of a number of teeth in a pinion ring with which the pinwheel mates.

In accordance with another aspect, a ratchet device comprises a central shaft, a gear portion through which the central shaft passes and positioned at a first end of the central shaft, and a pinion ring portion through which the central shaft passes and positioned adjacent the gear portion, the pinion ring portion comprising a plurality of angled teeth positioned around an inner circumference thereof. The ratchet device further comprises a pinwheel through which the central shaft passes and which is inserted into the pinion ring portion, the pinwheel comprising a plurality of flexible angled spokes that mate with the angled teeth of the pinion ring portion, a stepped washer through which the central shaft passes and which aligns the pinwheel coaxially with the pinion ring portion and abuts the pinion ring portion, and a worm screw coupled to a second end of the central shaft.

One advantage is that ratchet manufacturing cost is reduced.

Another advantage is that ratchet failure rate is improved.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

The foregoing problems are overcome by the herein-described ratchet device(s), which employ a hub and spoke design that permits multiple pinwheel spokes to participate in the ratchet action. The described pinwheel is made of a flexible material, such as polyethylene plastic, that is cheap to mold and capable of flexion. In this way the described ratchet device comprises fewer parts than conventional ratchet designs, thereby reducing cost and failure rates.

Figure 1:
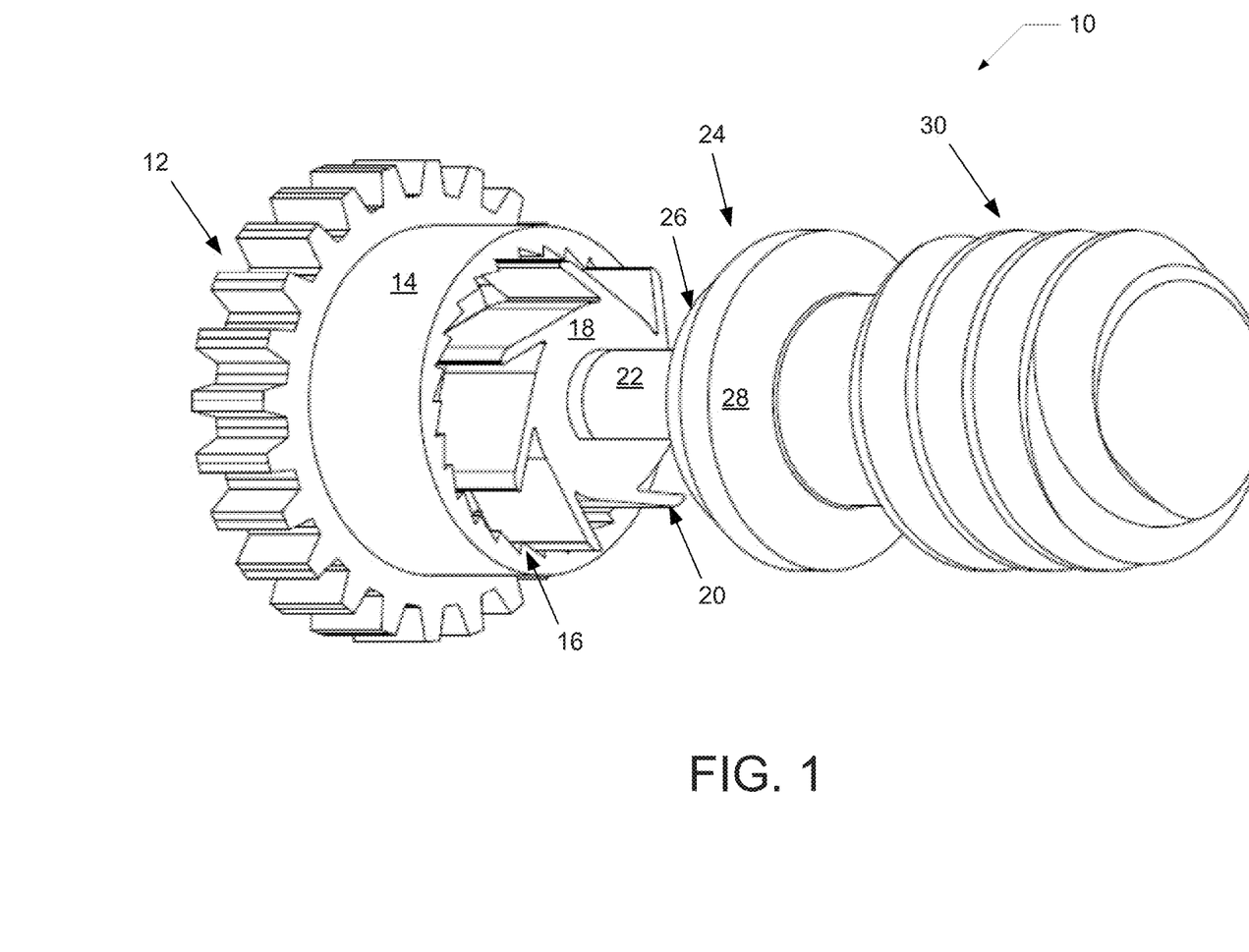
FIG. 1 illustrates an exploded view of a ratchet device that employs a hub (pinwheel) and spoke design, in accordance with one or more features described herein.

FIG. 1 illustrates an exploded view of a ratchet device 10 that employs a hub (pinwheel) and spoke design, in accordance with one or more features described herein. The device 10 comprises a gear portion 12 coupled to a cylindrical or ring-shaped pinion ring portion 14 comprising a plurality of teeth 16. A pinwheel portion 18, also referred to a "ratchet" herein, comprises a plurality of spokes 20 that releasably cooperate with recesses between the teeth 16 of the pinion ring. A central shaft 22 extends from the pinwheel through a washer 24 comprising an upper portion 26 having a first diameter that fits into the interior diameter of the pinion, and a lower portion 28 having a second diameter, larger than the first diameter, that provides a bearing surface against the pinion ring portion 14 when the ratchet device 10 is assembled. In one embodiment, a worm screw portion 30 is also coupled to the shaft 22 adjacent the lower portion 28 of the washer 24. However, it will be understood that in other embodiments, other mechanisms can be coupled to the ratchet device and actuated when the ratchet is operated.

In one embodiment in which the ratchet device is employed in a slack adjuster, the washer 24 includes a position sensing feature, which comprises a protrusion on the washer (see, e.g., FIGS. 11-14) that keeps the slack adjuster from returning back to a true zero position, to prevent, e.g., locking of brake pads against a drum or the like.

In another embodiment, the device comprises the central shaft 22 with radially symmetric spokes 20 that interface with the teeth 16 on the inside surface of the pinion ring 14. The teeth are asymmetric triangles with the long edge progressing clockwise around the circumference of the ring. The spokes of the ratchet mechanism are not perpendicular with the shaft surface. Instead they are angled relative to the surface of the shaft, and the angle of the spokes progresses in a counterclockwise direction. As the shaft is rotated relative to the ring counterclockwise, the spokes of the ratchet deflect as each spoke passes the peak of each tooth. The long surface of the tooth and the spoke are roughly parallel when not deflected. This motion is permitted because the deflection of the spoke is small. If the shaft is rotated clockwise relative to the ring, the teeth and the spokes interfere. The short surface of the tooth and spoke are more perpendicular. This arrangement forces the tip of the spoke into the valley between teeth and prevents rotation in the clockwise direction. The direction of motion can be changed by flipping the direction of both the teeth and spokes. That is, the herein described ratchet device can arranged to have a left-handed (counterclockwise) manner of operation or a right-handed (clockwise) manner of operation.

According various aspects described herein, the gear portion 12 may cooperate with any one-way adjustment mechanism, such as those found in industrial tools, winches, and air brake products such as slack adjusters and air disc brake actuators. In one example, the worm screw 30 may be mated with, e.g., the adjustment mechanism of a grounded-style slack adjuster.

In another embodiment, the pinion has N teeth, where N is an integer, and the pinwheel has N/4 spokes. It will be understood however, that the pinion may comprise any number of teeth, which may be a multiple of the number of spokes on the pinwheel. Additionally or alternatively, the number of teeth in the pinion is selected as a function if a desired fineness of adjustment of the ratchet device, such that a greater number of teeth corresponds to a finer level of adjustment granularity and a lesser number of teeth corresponds to a rougher level of adjustment granularity. The number of spokes can also be selected as a function of an amount of force to be held by the ratchet device, such that a greater number of spokes provides more rigidity in the pinwheel and thus more load-bearing capability, while a lesser number of spokes provides more flexibility (i.e., greater ease of actuation) with less load-bearing capability.

Figure 2:
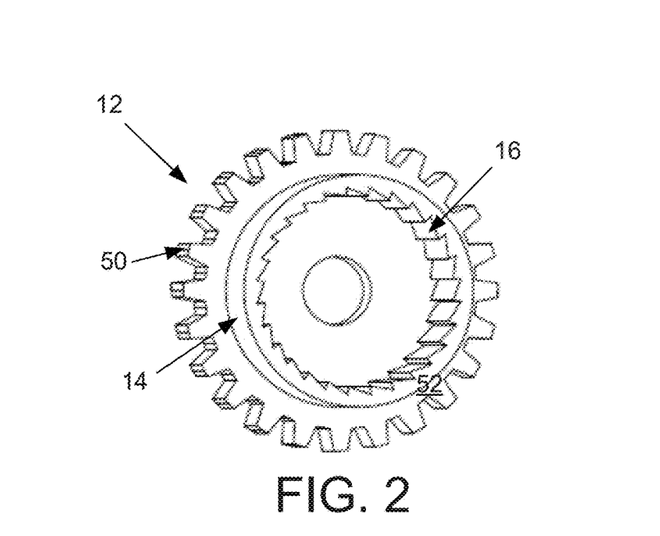
FIG. 2 illustrates a perspective view of the gear portion and pinion portion, in accordance with one or more features described herein.

FIG. 2 illustrates a perspective view of the gear portion 12 and pinion ring portion 14, in accordance with one or more features described herein. The gear portion comprises a plurality of teeth 50 and is coupled to the pinion ring portion 14, which comprises the plurality of teeth 16 arranged uniformly about the circumference of the interior 52 of the pinion ring. The interior 52 of the pinion ring has an inner diameter that accommodates an outer diameter of the pinwheel (FIG. 1) that is received thereby when the ratchet device is assembled. In one embodiment, each triangular tooth has a long side and a short side, the ratio of the short side to the long side being, e.g., approximately 1:3 so that each spoke is substantially parallel to the long side of a first tooth and substantially perpendicular to the short side of an adjacent tooth when positioned in a recess or valley between the adjacent teeth.

In a more specific but non-limiting example, for a pinion ring 14 having an interior diameter of 14.45 mm as measured across the tips of the concentric teeth 16, then the diameter measured across the troughs between the triangular teeth may be 15.65 mm. In this case, each tooth measures 0.6 mm in height, and has a long side across which a spoke can slide measuring approximately 1.8 mm and a short side against which a spoke can lock measuring approximately 0.6. However, it will be appreciated the height and side lengths of each tooth are not limited to the foregoing but rather can be any desired height or lengths to achieve the herein-described objectives. Furthermore, tooth size, shape, etc., can be a function of pinion diameter, spoke number, or any other suitable parameter, as will be understood by those of skill in the art.

Figure 3:
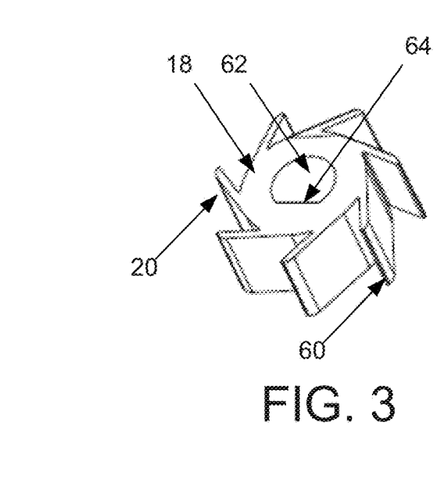
FIG. 3 illustrates a perspective view the pinwheel with the plurality of spokes that interface with the teeth of the pinion ring, in accordance with one or more features described herein.

FIG. 3 illustrates a perspective view the pinwheel 18 with the plurality of spokes 20 that interface with the teeth 16 (FIGS. 1 and 2) of the pinion ring 14 (FIGS. 1 and 2), in accordance with one or more features described herein. Each spoke has a rounded or beveled distal edge surface 60 that facilitates mating with recesses between the teeth of the pinion ring. In the depicted example, the pinwheel comprises 7 spokes. However, it will be understood that more or fewer spokes can be employed in accordance with various embodiments. The pinwheel 18 also includes a hole 62 that is largely circular and includes a flat side 64 that mates with a flat side 70 (see FIG. 4) of the central shaft 22 (FIG. 4) to prevent rotation of the pinwheel 18 independent of the forced rotation through the shaft 22.)

Figure 4:
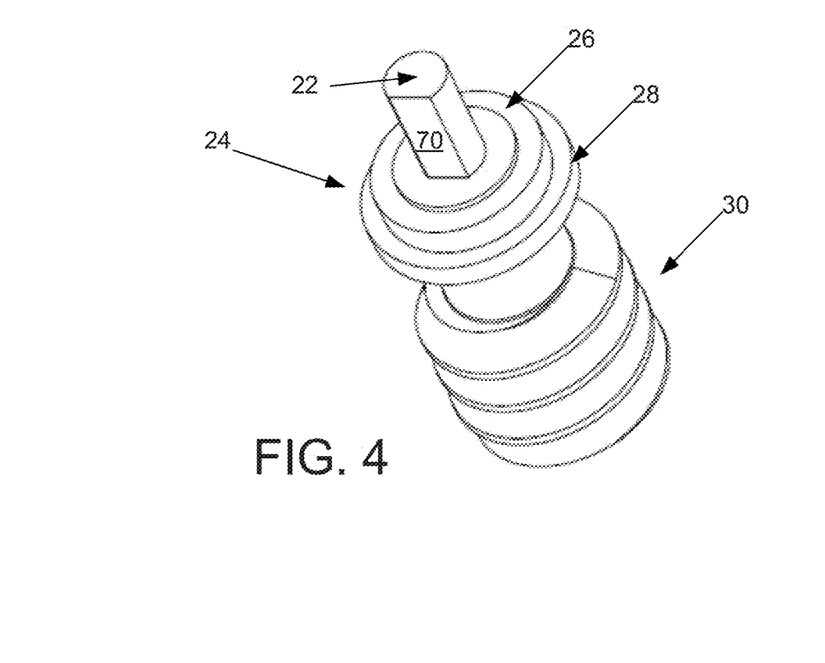
FIG. 4 illustrates a perspective view of the central shaft with washer and worm screw assembly, in accordance with one or more features described herein.

FIG. 4 illustrates a perspective view of the central shaft 22 with washer 24 and worm screw assembly, in accordance with one or more features described herein. The central shaft is shown as being cylindrical with a flat side along its length for impeding rotation of assembled components through which the central shaft passes. The central shaft 22 extends through a stepped washer 24 comprising an upper portion 26 having a first diameter that fits into the interior diameter of the pinion, and a lower portion 28 having a second diameter, larger than the first diameter, that provides a bearing surface against the bottom surface of the pinion ring portion when the ratchet device is assembled. A worm screw portion 30 is also coupled to the shaft 22 adjacent the lower portion 28 of the washer 24.

Figure 5:
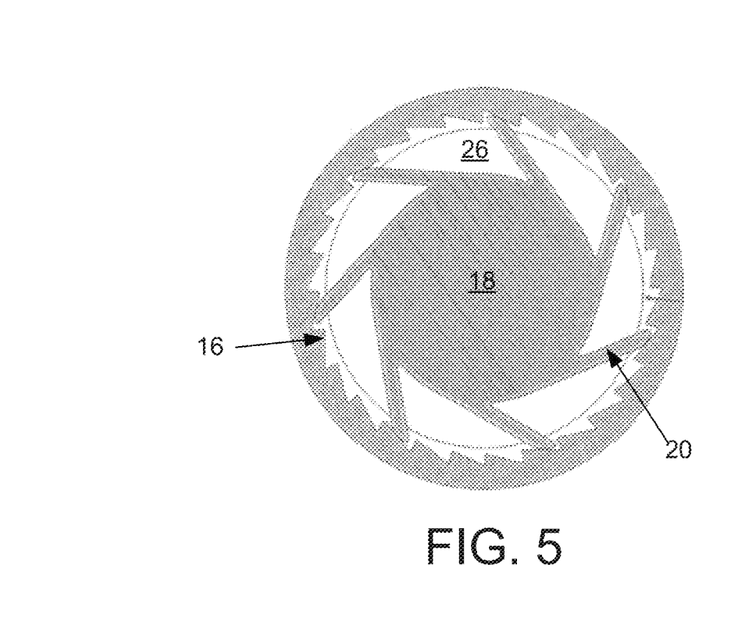
FIG. 5 illustrates a top-down view of the pinwheel seated inside the pinion portion, in accordance with one or more features described herein.

FIG. 5 illustrates a top-down view of the pinwheel 18 seated inside the pinion ring portion 14, in accordance with one or more features described herein. As can be seen, the spokes 20 of the pinwheel are engaged within recesses or valleys between the teeth 16 of the pinion ring 14. The upper portion 26 of the washer 24 (FIG. 1) is shown beneath the pinwheel and biases the pinwheel upward into the cavity of the pinion ring. Counterclockwise rotation of the pinwheel (or clockwise rotation of the pinion ring) causes the spokes 20 to jam into the recesses between the teeth. Clockwise rotation of the pinwheel (or counterclockwise rotation of the pinion ring) permits the spokes to slip past the teeth. This can be achieved by employing a material like polyethylene (e.g., a plastic or the like) when molding the pinwheel that permits the spokes to flex a predefined amount.

Figure 6:
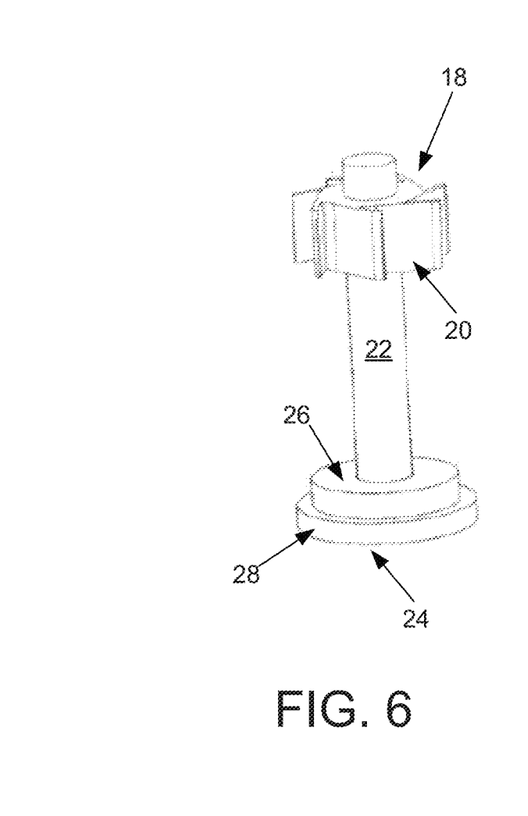
FIG. 6 shows the pinwheel and shaft assembly with the washer on the shaft prior to full assembly against the bottom surface of the pinwheel, in accordance with one or more features described herein.

FIG. 6 shows the pinwheel 18 and shaft 22 assembly with the washer 24 on the shaft prior to full assembly against the bottom surface of the pinwheel, in accordance with one or more features described herein. The pinwheel head is arranged to be inserted into pinion ring (FIGS. 1, 2, and 5) where the spokes 22 engage the teeth of the pinion ring as described herein. During assembly, the washer 24 slides up the shaft 22 until the top surface of the upper portion 26 of the washer abuts the bottom surface of the pinwheel 18, and the top surface of the second portion 28 of the washer abuts a bottom surface of the pinion ring into which the pinwheel is inserted. The upper portion 26 of the washer 24 thus keeps the pinwheel coaxial with the pinion ring, while the lower portion of the 28 of the washer 24 provides a bearing surface against the pinion ring. The upper portion is designed to have a diameter slightly smaller than an inner diameter of the pinion ring. The lower portion 28 is designed to have a diameter equal to the outer diameter of the pinion ring in order to provide a smooth continuous outer surface when the ratchet devices is assembled.

Figure 7:
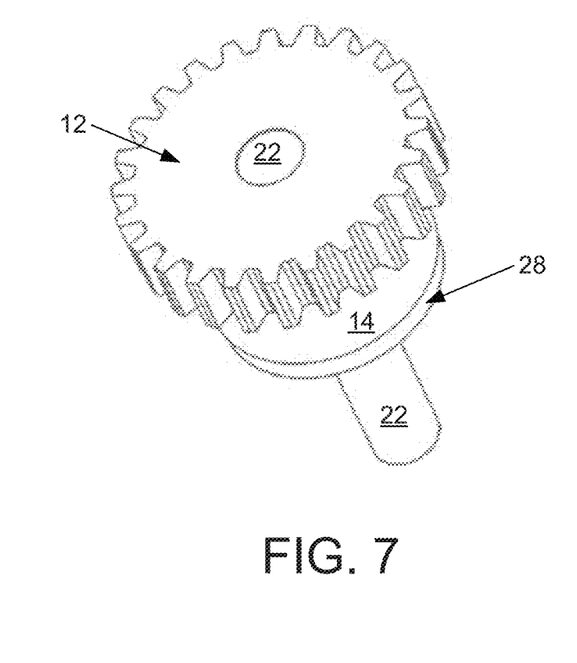
FIG. 7 shows a perspective view of the gear and pinion assembly on the shaft, in accordance with one or more features described herein.

FIG. 7 shows a perspective view of the gear and pinion assembly on the shaft 22, in accordance with one or more features described herein. As shown, the gear portion 12 is positioned at a top end of the shaft 22. The pinion ring 14 is biased upward against the gear portion by the stepped washer, of which only the lower portion 28 is visible when once the gear 12 and pinion ring 14 are assembled on the shaft.

Figure 8:
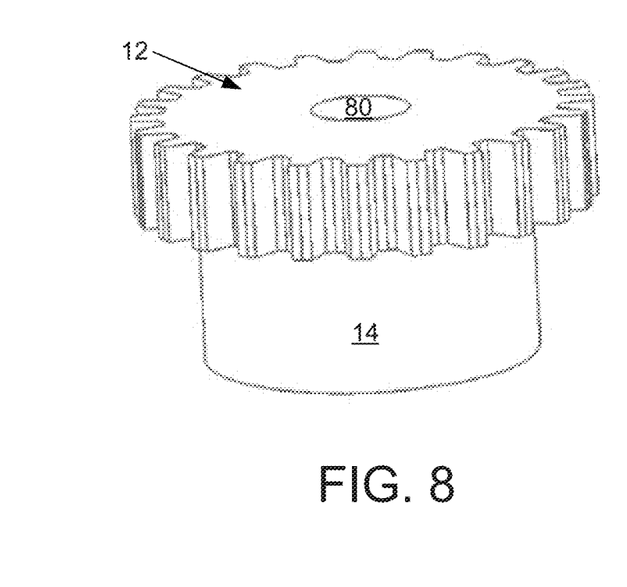
FIG. 8 shows a side view of the gear and pinion assembly, in accordance with one or more features described herein.

FIG. 8 shows a side view of the gear and pinion assembly, in accordance with one or more features described herein. As shown, pinion ring 14 is biased upward against the gear portion 12, which includes a hole 80 through which the shaft is passed.

Figure 9:
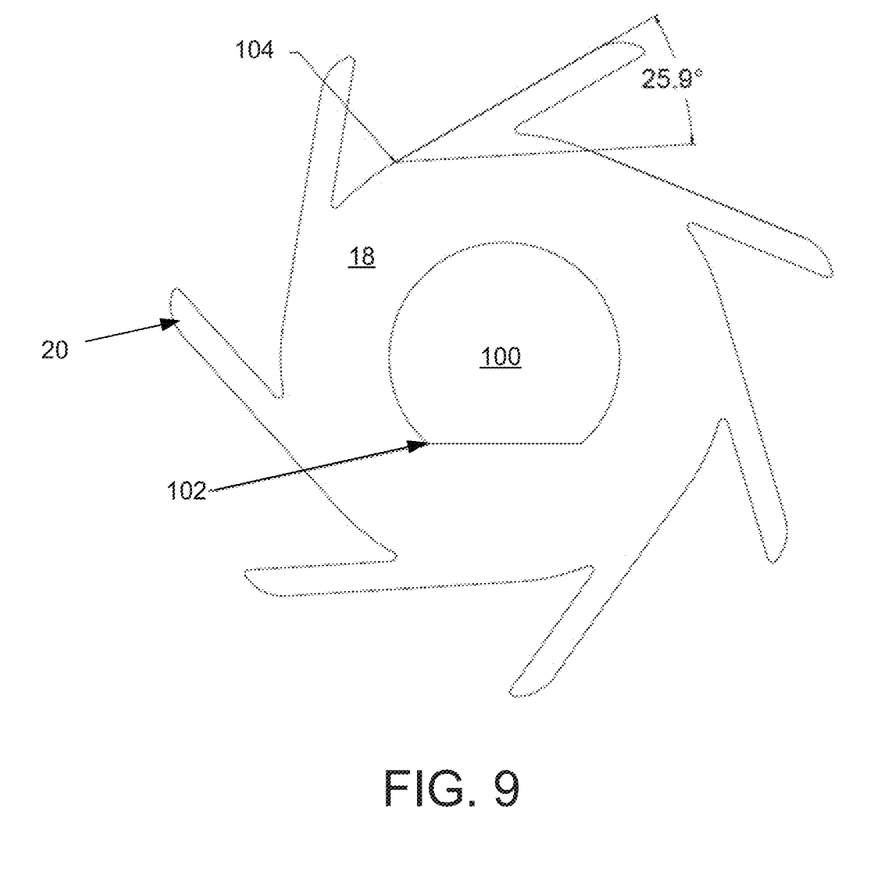
FIG. 9 shows a top-down view of the pinwheel with spokes, in accordance with various embodiments described herein.

FIG. 9 shows a top-down view of the pinwheel 18 with spokes 20, in accordance with various embodiments described herein. The pinwheel 18 comprises a hole 100 having a flat side 102 that mates with a corresponding flat side on an otherwise cylindrical shaft (not shown) to prevent rotation of the pinwheel independent of the forced rotation through the shaft. In one embodiment, the spoke angle 104 of each spoke 20 relative to the pinwheel is approximately 25.9° when a 7-spoke arrangement is employed. "Spoke angle" as used herein denotes the angle between the edge of the spoke and a line connecting an insertion point of the spoke with the insertion point of a next spoke. It will be understood by those of skill in the relevant art that the angles of the spokes relative to the pinwheel may change according to the number of spokes employed, the number of teeth in the ratchet, the slopes of the long and short sides of the teeth, etc.

Figure 10:
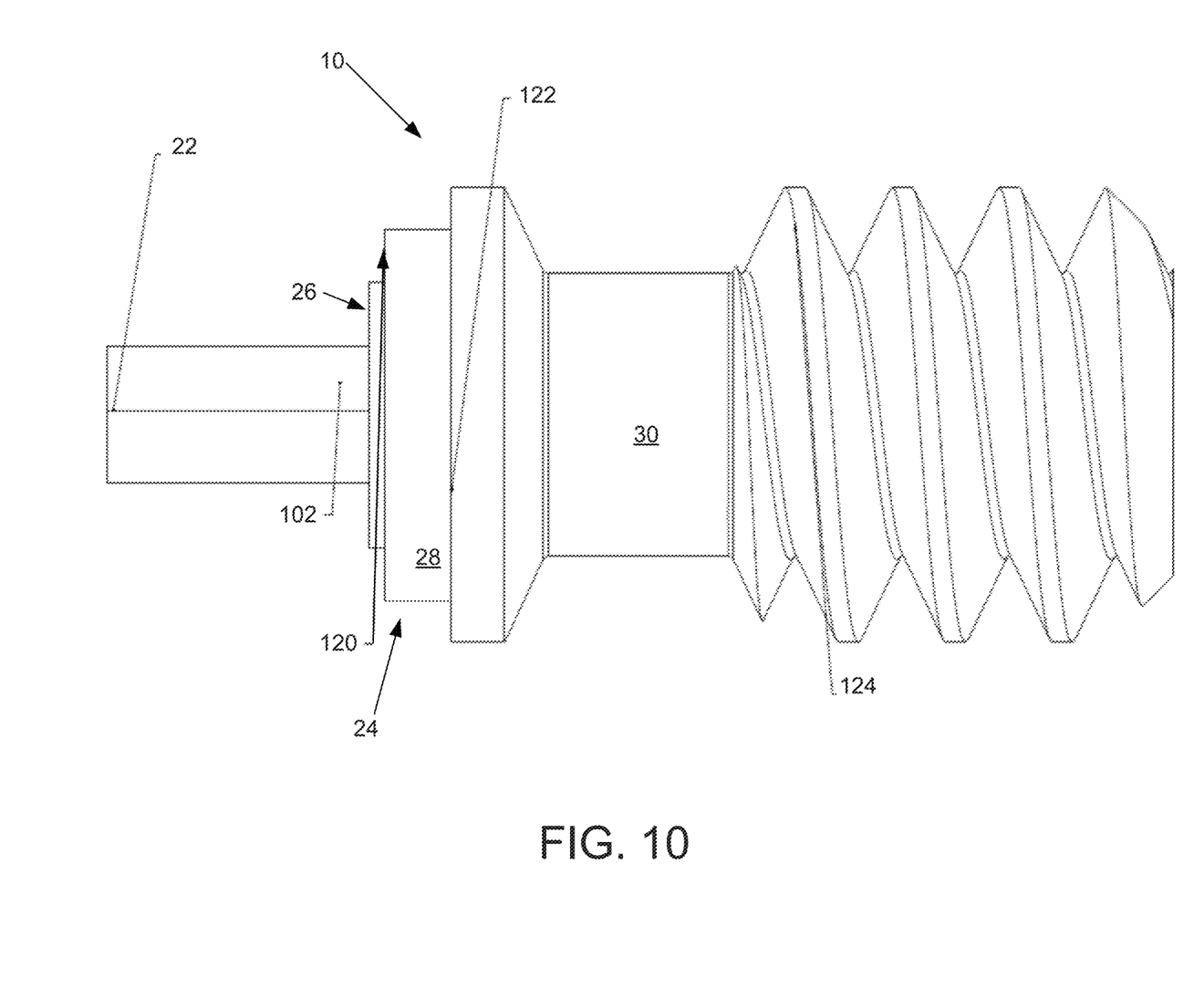
FIG. 10 shows a side view of the ratchet device coupled to a worm screw, in accordance with one or more aspects described herein.

FIG. 10 shows a side view of the ratchet device 10 coupled to a worm screw 30, in accordance with one or more aspects described herein. The shaft 22 is shown, which holds the ratchet in place and is received by a hole in the top of the pinion (not shown). The shaft 22 includes a flat lengthwise side that interfaces with a complementary flat side of the hole in the ratchet device to prevent unintended rotation thereof. Also shown is the stepped washer 24, which includes an upper portion 26 and a lower portion 28. The shoulder 120 of the washer where the step-off occurs (i.e., the top surface of the bottom portion 28 of the washer 24) maintains coaxial orientation between the ratchet and the pinion portion of the device. The face 122 of the worm screw keeps the pinion seated correctly. The threads 124 of the screw 30 can be specified for a given application to have a desired size, diameter, pitch, etc.

Figure 11:
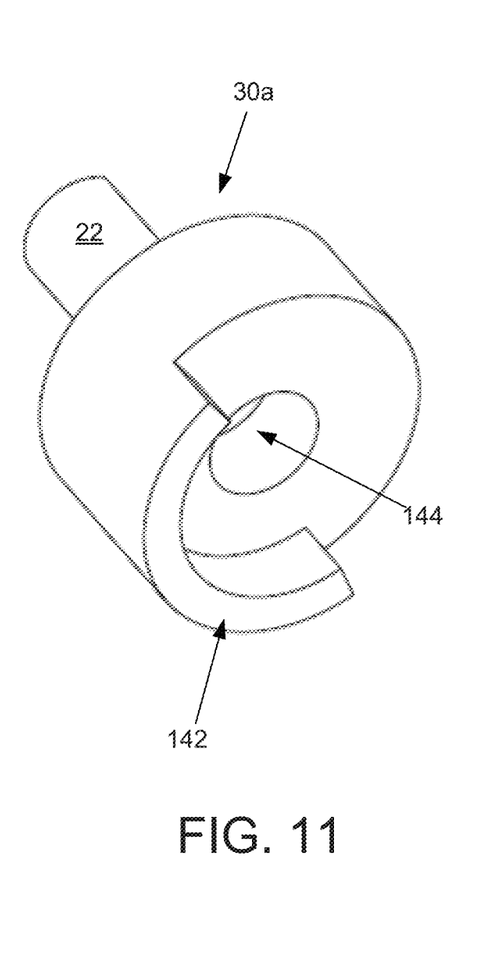
FIG. 11 shows a perspective view of an upper portion of the screw portion that includes a position sensing feature that comprises a raised lip or protrusion, in accordance with various features described herein.

FIG. 11 shows a perspective view of an embodiment of an upper portion 30a of the screw portion 30 (see, e.g., FIGS. 1, 4, and 10) wherein the upper portion 30a of the screw portion includes a position sensing feature 142 that comprises a raised lip or protrusion that cooperates with a corresponding lip or protrusion 150 (see FIG. 12) on a lower portion 30b (FIG. 12) of the screw portion 30 of the herein-described ratchet device, in accordance with various features described herein. As illustrated, the central shaft 22 mates with the upper portion 30a of the screw portion, and the upper portion 30a further comprises a central aperture 144 that receives a shaft or stem 152 (FIG. 12) on the lower portion 30b. In one embodiment, the upper portion 30a includes a stepped washer 24 where the upper portion 30a mates with the shaft 22, such as is shown in FIG. 4.

Figure 12:
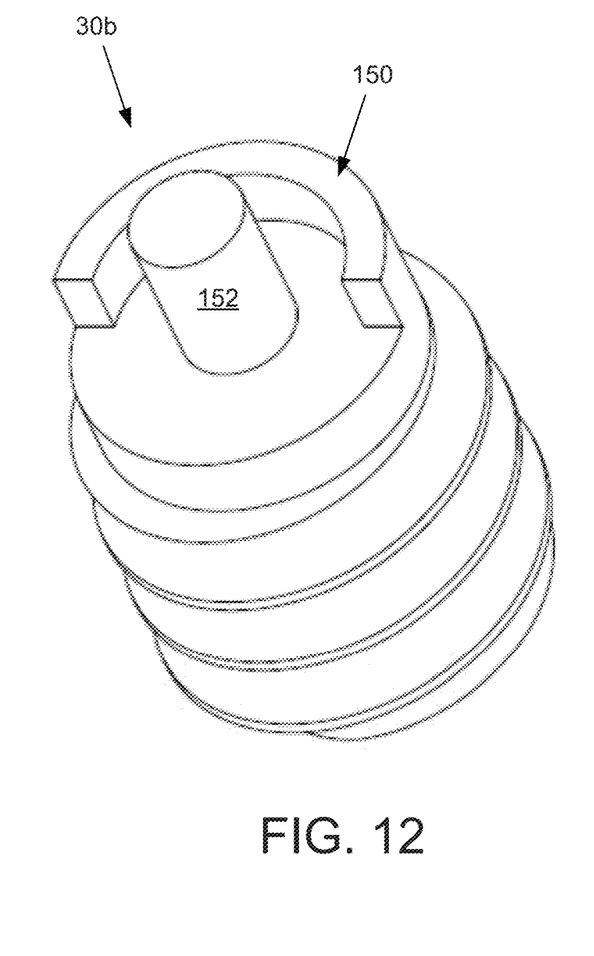
FIG. 12 shows a perspective view of a lower portion of the screw portion that includes a position sensing feature that comprises a raised lip or protrusion that cooperates with a corresponding lip or protrusion on the upper portion of the screw portion of the herein-described ratchet device, in accordance with various features described herein.

FIG. 12 shows a perspective view of an embodiment of lower portion 30b of the screw portion 30 (see, e.g., FIGS. 1, 4, and 10) wherein the lower portion 30b of the screw portion includes a position sensing feature 150 that comprises a raised lip or protrusion that cooperates with a corresponding lip or protrusion 142 (see FIG. 11) on the upper portion 30a (FIG. 11) of the screw portion 30 of the herein-described ratchet device, in accordance with various features described herein. The lower portion 30b of the screw portion also comprises a shaft or stem 152 that is received by the aperture 144 (FIG. 11) when the herein-described ratchet device is assembled.

Figure 13:
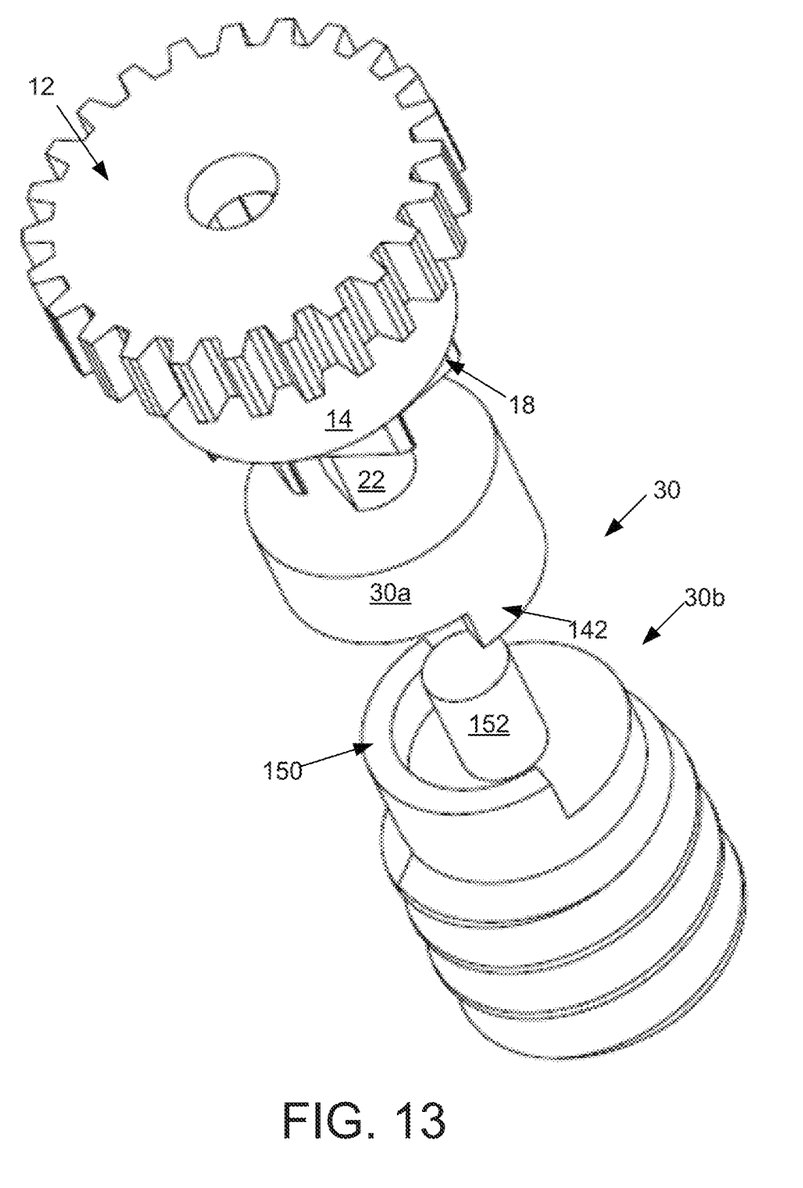
FIG. 13 shows an exploded view of the herein-described ratchet device with the screw portion including the upper portion and lower portion, in accordance with various embodiments described herein.

FIG. 13 shows an exploded view of an embodiment of the ratchet device with the screw portion 30 including the upper portion 30a and lower portion 30b, in accordance with various embodiments described herein. The device includes the gear portion 12 coupled to the pinion ring 14, which receives the pinwheel portion 18, all of which are mated with and aligned by the central shaft 22. The lower portion 30b of the screw portion 30 includes the shaft 152, which is received by the aperture 144 (FIG. 11). The lower portion 30b of the screw portion includes a position sensing feature 150 that comprises a raised lip or protrusion that cooperates with the corresponding lip or protrusion 142 on the upper portion 30a to prevent the ratchet device from returning to a zero position.

Figure 14:
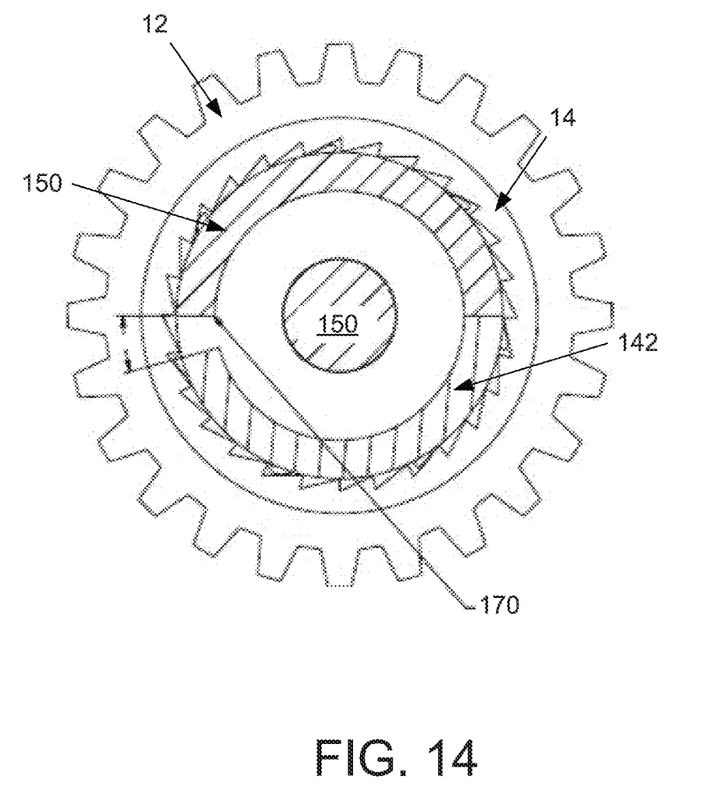
FIG. 14 shows a bottom-up view of the ratchet device, showing the gear portion and the pinion ring, and the protrusion of the upper portion of the screw portion mated with the protrusion of the lower portion of the screw portion.

FIG. 14 shows a bottom-up view of an embodiment the ratchet device, showing the gear portion 12 and the pinion ring 14, as well as the protrusion 142 of the upper portion of the screw portion (shown with vertical hashing) mated with the protrusion 150 (shown in diagonal hashing) of the lower portion of the screw portion. The protrusion 142 and the protrusion 150 cooperate to form the herein-described position sensing feature, wherein a gap 170 between the protrusions 142, 150 is predefined to correspond to a level or magnitude of brake pad clearance (e.g., in an embodiment wherein the herein-described slack adjustment device is employed in a vehicle, such as a commercial vehicle or the like). In one embodiment, the gap 170 is predefined to be approximately 15°. However, it will be appreciated by those of skill in the art that the gap may be set to accommodate other brake pad clearances.

Figure 15:
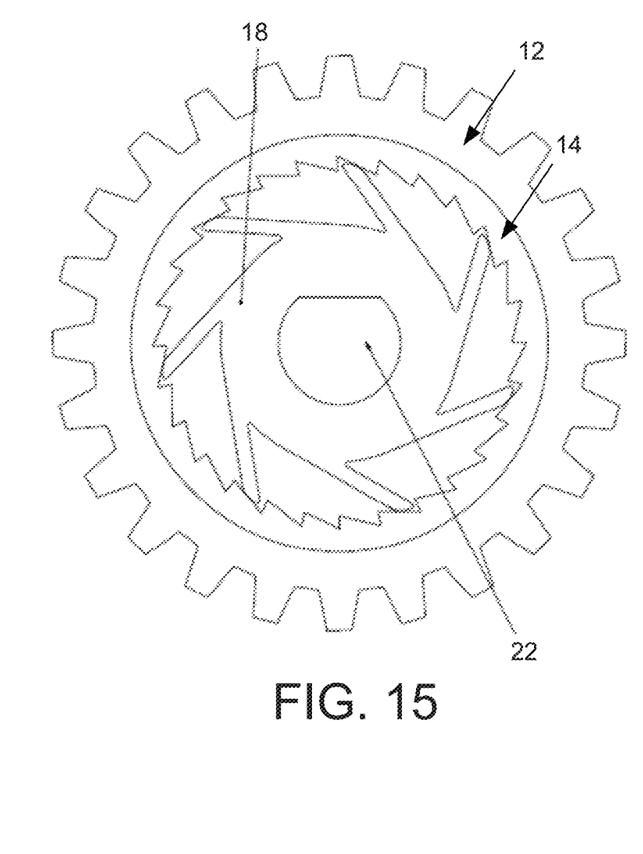
FIG. 15 illustrates an embodiment of the ratchet device in which the device is oriented for a clockwise adjustment.

FIG. 15 illustrates an embodiment of the ratchet device in which the device is oriented for a clockwise adjustment. As shown, the device includes the gear portion 12 and pinion ring 14, the pinwheel 18, and shaft 22.

Figure 16:
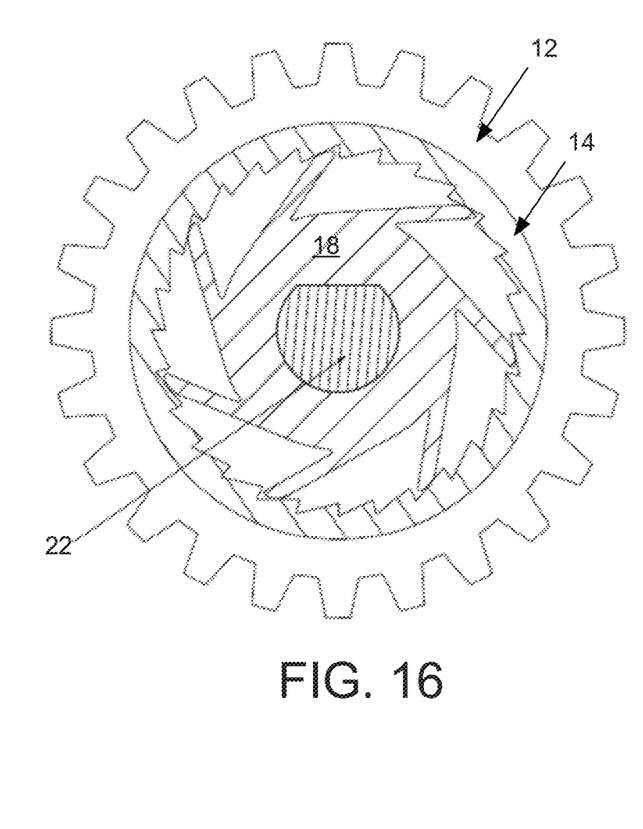
FIG. 16 illustrates an embodiment of the ratchet device in which the device is oriented for a counterclockwise adjustment.

FIG. 16 illustrates an embodiment of the ratchet device in which the device is oriented for a counterclockwise adjustment. As shown, the device includes the gear portion 12 and pinion ring 14, the pinwheel 18, and shaft 22.

With continued reference to FIGS. 1-14, in a non-limiting example, the pinion ring has an inner diameter of approximately 14.45 mm, such that a ring drawn across the tips of the respective teeth has a diameter of 14.45 mm. The pinwheel has an outer diameter (e.g., across the tips of the spokes) of approximately 15 mm, so that the spokes 20 extend into the recesses between the teeth 16. A diameter for a circle inscribed through the lowest points between teeth (i.e., the valleys between the teeth) measures approximately 15.65 mm. The pinion ring 14 has an outer diameter of 17.5 mm.

The shaft 22 in the instant example has a diameter of 5.19 mm and fits snugly into corresponding holes through each of the gear portion 12, the pinion portion 14, the pinwheel 18, and the washer 24, and is press fit into the worm screw portion.

In one embodiment, the pinwheel is designed to have 7 spokes and the pinion ring has 28 teeth. In other examples, more of fewer spokes and/or teeth may be employed. In another embodiment, the number of spokes is a predetermined percentage of the number of teeth (e.g., 20%, 30%, 35%, etc.) rounded up to the next integer. Alternatively, the number of spokes is a factor of the number of teeth. For instance, if the number of teeth is 28 as in the above example, then the pinwheel may include 2, 4, 7, 14, etc. spokes.

Advantageously, a higher number of spokes introduces redundancy to the pinwheel so that one or more spokes may fail without rendering the ratchet device inoperable, thereby increasing ratchet life. In addition, the greater the number of spokes the greater the holding torque provided by the ratchet device.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A ratchet device for a slack adjuster, comprising:
    a central shaft;
    a pinion ring portion positioned on the central shaft and comprising a plurality of teeth uniformly and circumferentially arranged on an interior circumference thereof;
    a pinwheel positioned on the central shaft and comprising a plurality of angled spokes that cooperate with the teeth to lock the ratchet device and prohibit reverse motion; and
    a stepped washer positioned on the central shaft and which aligns the pinwheel coaxially with the pinion ring portion and provides a bearing surface for the pinwheel;
    wherein the stepped washer comprises a position sensing feature through which the central shaft passes and which comprises a raised protrusion that cooperates with a corresponding protrusion on a screw portion.

2. The ratchet device according to claim 1, wherein the stepped washer has an upper portion having a diameter that fits within an inner diameter of the pinion ring portion.

3. The ratchet device according to claim 1, wherein the stepped washer has a lower portion having a diameter equal to an outer diameter of the pinion ring portion.

4. The ratchet device according to claim 1, further comprising a gear portion coupled to the pinion ring portion and which turns the pinion ring portion when actuated.

5. The ratchet device according to claim 1, wherein the pinwheel and spokes are formed of a flexible material that permits the spokes to flex and pass over the teeth when the ratchet device is advanced in a forward direction.

6. The ratchet device according to claim 1, wherein the spokes lock into recesses between the teeth when the ratchet device is not being advanced in a forward direction, in order to prevent rotation of the ratchet device in a reverse direction.

7. The ratchet device according to claim 1, wherein the teeth are triangular and comprise a first, longer side that is substantially parallel to the spokes as the spokes slide past the first side during forward motion of the ratchet device.

8. The ratchet device according to claim 7, wherein the teeth comprise a second, shorter side that is substantially perpendicular to the tips of the spokes and against which the spokes lock when the ratchet device is not being actuated.

9. The ratchet device according to claim 8, wherein the ratio of the lengths of the first and second sides of the teeth is in the range of approximately 1:2.5-1:4.5.

10. The ratchet device according to claim 1, wherein the pinion ring portion comprises 28 teeth, and the pinwheel comprises 7 spokes.

11. The ratchet device according to claim 1, wherein the pinwheel comprises a predetermined number of spokes, and wherein the number of teeth in the pinion wheel is a multiple of the number of spokes.

12. The ratchet device according to claim 1, wherein the pinion has N teeth, where N is an integer, and the pinwheel has N/4 spokes.

13. The ratchet device according to claim 1, wherein the number of teeth in the pinion is selected as a function of a fineness of adjustment of the ratchet device, such that a greater number of teeth corresponds to a finer level adjustment granularity and a lesser number of teeth corresponds to a rougher level of adjustment granularity.

14. The ratchet device according to claim 1, wherein the number of spokes is selected as a function of an amount of force to be held by the ratchet device.

15. The ratchet device according to claim 1, wherein the central shaft has a flat longitudinal side and is otherwise cylindrical in shape.

16. The ratchet device according to claim 1, wherein a tip of each spoke that mates with the teeth of the pinion wheel is at least one of rounded, angled, or beveled.

17. A pinwheel for a ratchet device in a slack adjuster, comprising:
    a central portion from which a plurality of flexible angled spokes are arranged uniformly and extend;
    a central hole for receiving a central shaft, wherein the shaft is one of integrated with the central portion or received by a pinion ring with which the spokes mate;
    wherein the number of spokes in the plurality of spokes is a factor of a number of teeth in the pinion ring; and a stepped washer which aligns the pinwheel coaxially with the pinion ring and abuts the pinion ring;

wherein the stepped washer comprises a position sensing feature through which the central shaft passes and which comprises a raised protrusion that cooperates with a corresponding protrusion on a lower portion of a screw portion.

18. The pinwheel according to claim 17, wherein a diameter of the pinwheel is approximately 15 mm.

19. The pinwheel according to claim 17, comprising approximately 7 spokes.

20. The pinwheel according to claim 17, wherein the plurality of spokes comprises a number of spokes that is approximately 20%-35% of a number of pinion ring teeth with which the spokes mate.

21. The pinwheel according to claim 17, wherein the spokes are angled so as to slide over pinion ring teeth when the ratchet device is advanced, and to lock against the pinion ring teeth when the ratchet device is not being advanced.

22. A ratchet device for a slack adjuster, comprising:
a central shaft;
a gear portion through which the central shaft passes and positioned at a first end of the central shaft;
a pinion ring portion through which the central shaft passes and positioned adjacent the gear portion, the pinion ring portion comprising a plurality of angled teeth positioned around an inner circumference thereof;
a pinwheel through which the central shaft passes and is inserted into the pinion ring portion, the pinwheel comprising a plurality of flexible angled spokes that mate with the angled teeth of the pinion ring portion;
a stepped washer which aligns the pinwheel coaxially with the pinion ring portion and abuts the pinion ring portion; and
a worm screw coupled to a second end of the central shaft;
wherein the stepped washer comprises a position sensing feature through which the central shaft passes and which comprises a raised protrusion that cooperates with a corresponding protrusion on a lower portion of the worm screw.

\* \* \* \* \*